(12) United States Patent
Fauriot et al.

(10) Patent No.: US 7,338,315 B2
(45) Date of Patent: Mar. 4, 2008

(54) CLOSURE DEVICE WITH A MOVABLE FLAP

(75) Inventors: Jacques Fauriot, Limoges (FR); Etienne Rejou, Limoges (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 11/657,735

(22) Filed: Jan. 25, 2007

(65) Prior Publication Data
US 2007/0190814 A1 Aug. 16, 2007

(51) Int. Cl.
*H01R 13/66* (2006.01)
(52) U.S. Cl. ...................................................... 439/535
(58) Field of Classification Search ................ 439/535, 439/135–138, 140–144, 672, 676
See application file for complete search history.

(56) References Cited

U.S. PATENT DOCUMENTS

| | | | |
|---|---|---|---|
| 1,422,048 A | 7/1922 | Goodridge | |
| 4,713,016 A | 12/1987 | Kato et al. | |
| 5,964,600 A * | 10/1999 | Miles et al. | 439/140 |
| 6,869,297 B2 * | 3/2005 | Caveney | 439/138 |
| 2003/0040223 A1 | 2/2003 | Drewnicki | |

* cited by examiner

*Primary Examiner*—J. F. Duverne
(74) *Attorney, Agent, or Firm*—Miles & Stockbridge P.C.; Edward J. Kondracki

(57) ABSTRACT

The invention relates to a closure device comprising a wall, an opening provided in this wall, a flap which selectively adopts at least one closed position in which it blocks the opening and an open position in which it uncovers this opening. Pins are connected to a first edge of the flap, and recesses provided in the thickness of the wall on either side of the opening to receive the pins.

The device of the invention also comprises flexible arms which connect the pins to the first edge of the flap in an elastic manner in the direction of bringing the pins towards one another. These arms protrude from the first edge and from the rear face of this flap.

12 Claims, 4 Drawing Sheets

CLOSURE DEVICE WITH A MOVABLE FLAP

FIELD OF THE INVENTION

The invention relates in general to the design of closure systems with movable flaps, in particular for electrical sockets or computer sockets.

More specifically, the invention relates to a closure device comprising a wall having a front face and a rear face, an opening provided in this wall, a flap having a front face and a rear face which selectively adopts at least one of a closed position in which it blocks the opening and an open position in which it uncovers this opening, pins connected to a first edge of the flap, and recesses provided in the thickness of the wall on either side of the opening to receive the pins, these recesses cooperating with the pins to hold the flap relative to the wall at least in its closed position.

BACKGROUND

In the known devices of this type, the pins are generally formed on either side of the flap close to the first edge of the latter.

This solution requires the use of relatively flexible materials, as a result of which the pins are subject to rapid wear, even when the device is produced with very strict manufacturing tolerances.

SUMMARY OF THE INVENTION

The invention, which falls within this context, has the aim of providing a closure device which is free of this constraint regarding the choice of materials.

The device of the invention, which is of the type of the generic definition given in the preamble above, also comprises flexible arms which connect the pins to the first edge of the flap, biasing the pins towards one another, these arms protruding from the first edge and from the rear face of this flap.

It is also possible to provide that the device of the invention comprises a separating part arranged close to a first edge of the opening, adjacent to the first edge of the flap when this flap is in the closed position, that this separating part defines a retraction slot inside this opening, and that the flap can also move from its open position to a retracted position by sliding inside the retraction slot.

It may also be judicious to provide that the arms have a bayonet profile, that the recesses are hollowed out in the rear face of the wall beyond the slot with respect to the separating part, and that the flap passes from its closed position to its open position by tilting the rear face of the flap on the front edge of the separating part, inserting the first edge of the flap into the slot, and at the same time releasing the pins from the recesses.

Preferably, the pins have outer faces which slope towards a median plane of the flap, and the recesses are bordered by reliefs which each have a gentle slope in a direction of insertion of the pins and a steep slope in a direction of extraction of the pins, the flap thus being non-removable.

In the device of the invention, the wall may be made of a thermosetting polymer, while the flap, the arms and the pins may be made of polycarbonate.

BRIEF DESCRIPTION OF THE DRAWINGS

Other features and advantages of the invention will become clearly apparent from the following description thereof, which is given by way of non-limiting example and with reference to the appended drawings, in which.

DESCRIPTION OF THE PREFERRED EMBODIMENTS

Figure 1:
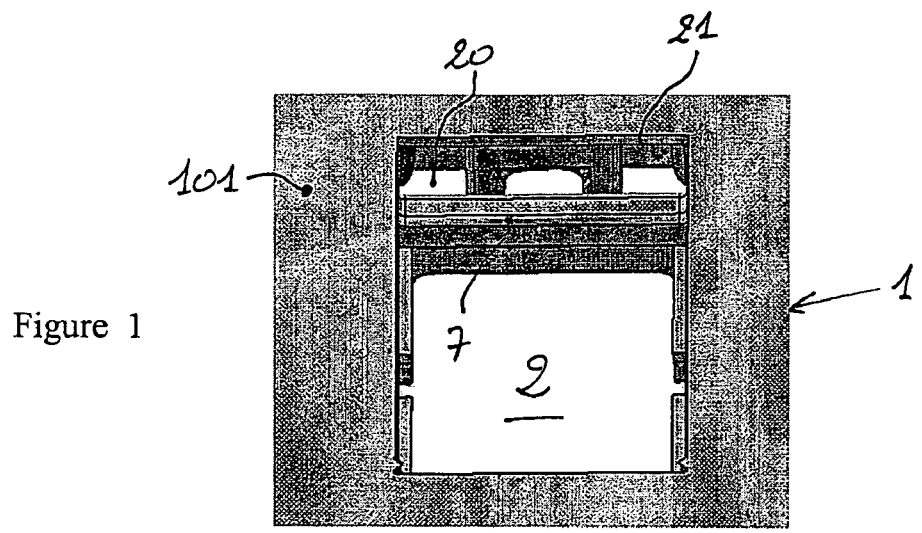
FIG. 1 is a view of the opening and of the front face of the wall.

As mentioned above, the invention relates to a closure device comprising in particular a wall 1, an opening 2 provided in the wall 1, a flap 3, pins 4 connected to the edge 31 of the flap 3 conventionally defined as the upper edge of this flap, and recesses 5 designed to receive the pins 4.

Figure 10:
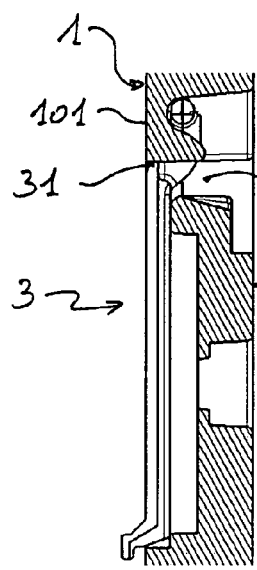
FIGS. 10A to 10F re partial sectional views of the device of the invention, showing six successive states of a phase of opening the flap.
Figure 10:
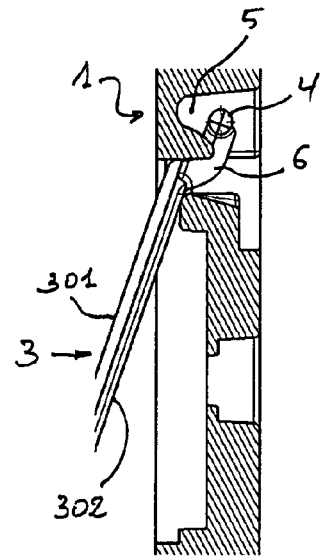
Figure 10:
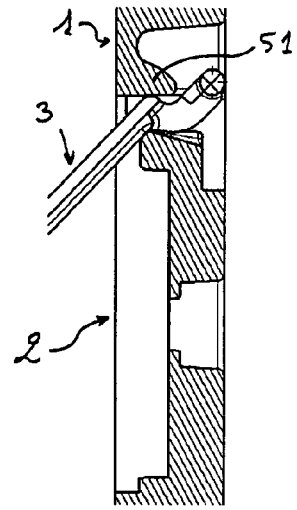
Figure 10:
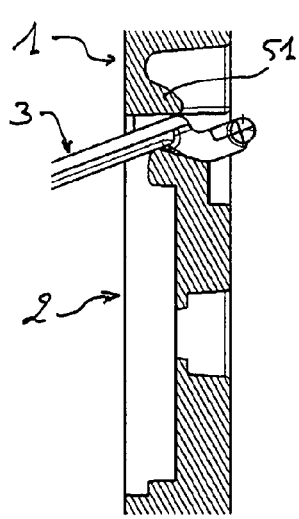
Figure 10:
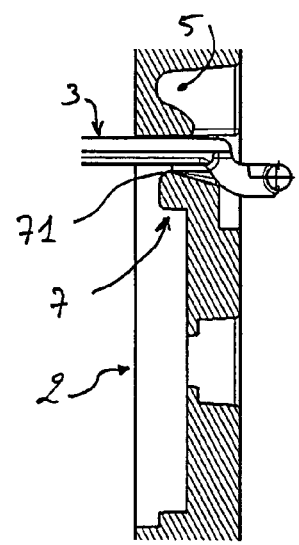
Figure 10:
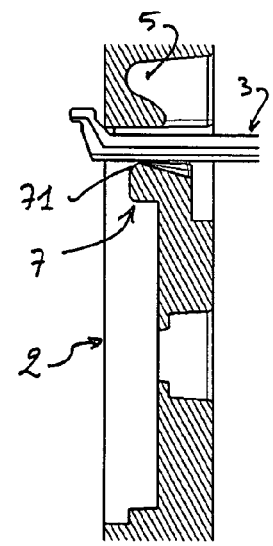

The flap 3 is mounted to move with respect to the wall 1 and can at least adopt, at will, a closed position in which it blocks the opening 2 (FIG. 10A) and an open position in which it uncovers this opening 2 (FIG. 10E).

The wall 1 and the flap 3 have respective front faces 101 and 301 and respective rear faces 102 and 302, only the front faces 101 and 301 being visible from the exterior of the device when the flap 3 is in its closed position.

The recesses 5 are provided in the thickness of the wall 1 on either side of the opening 2 to receive the pins 4 which cooperate with these recesses 5 to hold the flap 3 relative to the wall 1 at least in its closed position.

Figure 2:
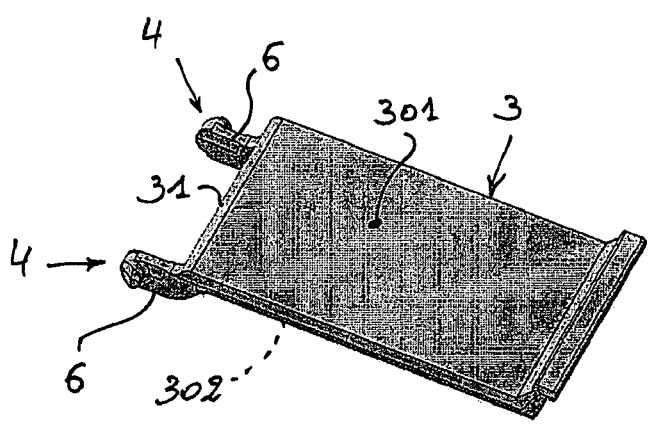
FIG. 2 is a perspective view of the flap.
Figure 3:
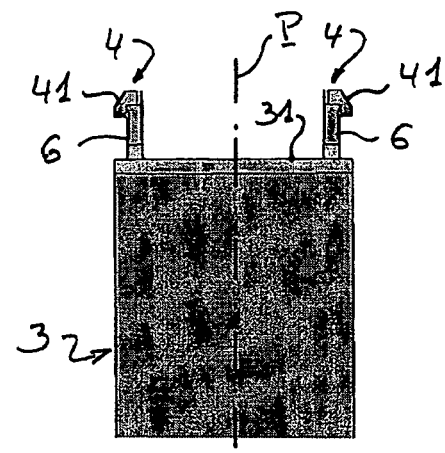
FIG. 3 is a partial front view of the flap.
Figure 4:
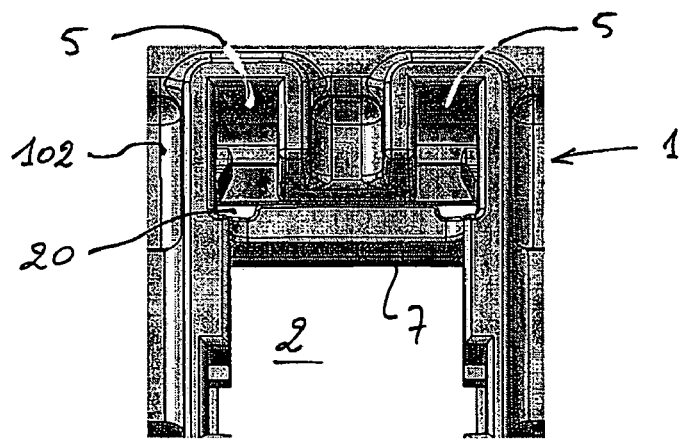
FIG. 4 is a partial view of the opening and of the rear face of the wall.
Figure 5:
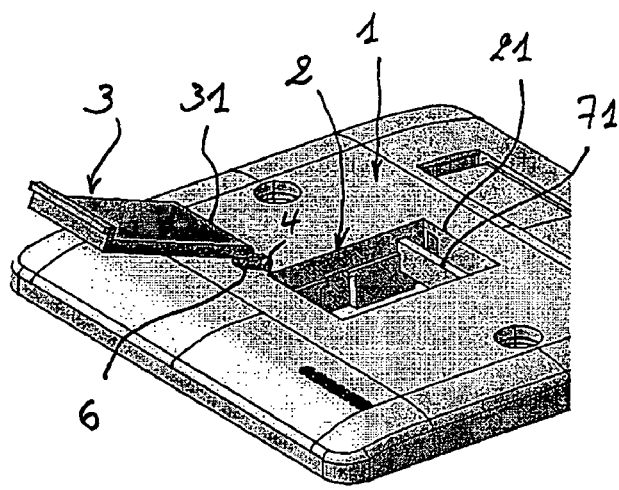
FIGS. 5 to 7 are partial perspective views of the device of the invention showing three successive states of a phase of installing the flap.

As shown in particular in FIGS. 2 and 3, the device of the invention also comprises flexible arms 6 which connect the pins 4 to the upper edge 31 of the flap 3 and which protrude from this edge 31 and from the rear face 302 of the flap 3.

The arms 6 are flexible in a direction transverse to the median plane P of the flap 3 so that they make it possible, via the application of an elastic force, to bring the pins 4 together and move them apart.

A retraction slot 20 may be defined inside the opening 2 by means of a separating part 7 which is arranged parallel to the upper edge 21 of this opening, that is to say parallel to the edge of the opening which is adjacent to the upper edge 31 of the flap 3 when this flap is in the closed position.

The flap 3 can thus be moved not just between its closed position and its open position, but also from its open position to a retracted position (FIG. 10F) and vice versa, the flap 3 reaching its retracted position by sliding inside the retraction slot 20.

The arms 6 preferably have a bayonet profile (FIGS. 10C to 10E), and the recesses 5 are hollowed out in the rear face 102 of the wall 1 beyond the slot 20 with respect to the separating part 7.

Thus, as shown in the succession of FIGS. 10A to 100, the flap 3 passes from its closed position to its open position by tilting the rear face 302 of the flap 3 on the front edge 71 of the separating part 7, at the same time inserting the upper edge 31 of the flap 3 into the slot 20, and at the same time releasing the pins 4 from the recesses 5.

As can best be seen from FIG. 3, the pins 4 have outer faces 41 which slope towards the median plane P of the flap 3.

Figure 8:
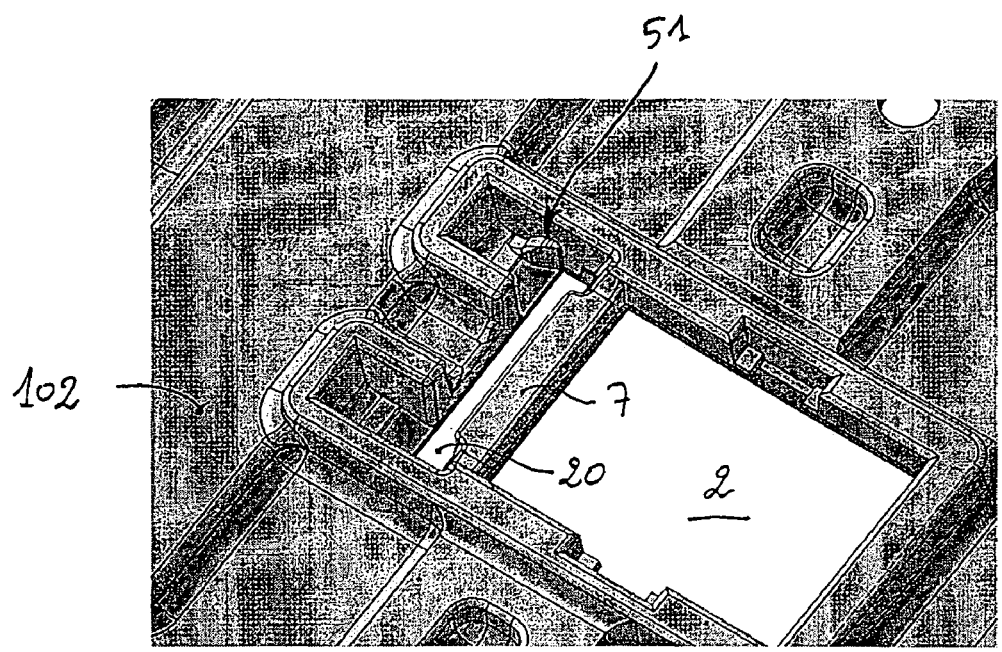
FIG. 8 is a close-up partial perspective view of the opening and of the rear face of the wall.
Figure 9:
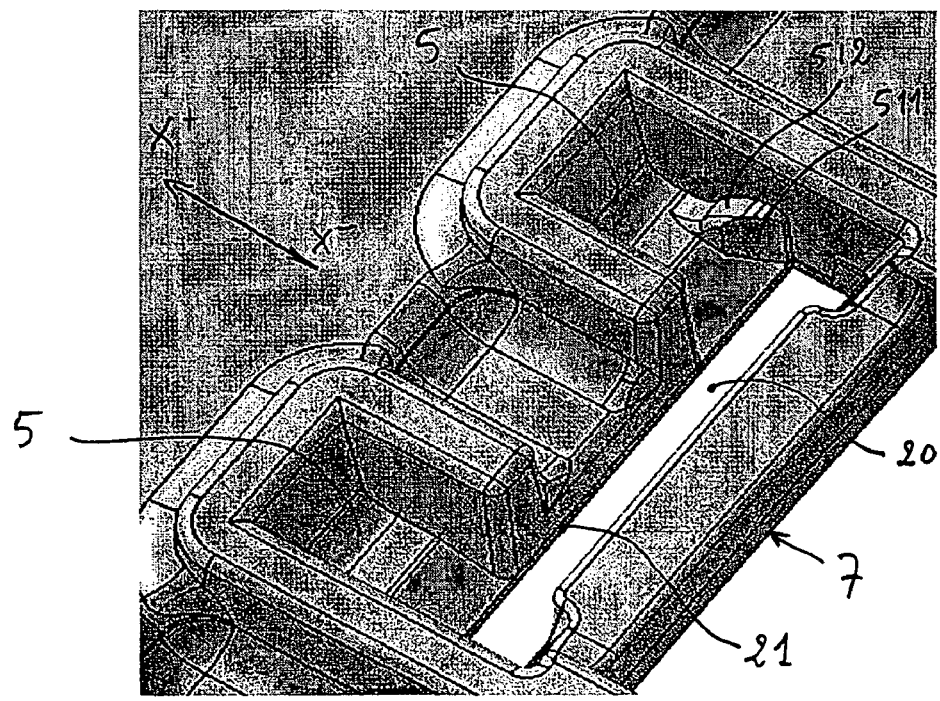
FIG. 9 is an enlarged view of part of FIG. 8.

In a corresponding manner (FIGS. 8 and 9), the recesses 5 are bordered by reliefs 51 which each have a gentle slope 511 in a direction X+ of insertion of the pins 4 and a steep slope 512 in a direction X− of extraction of the pins 4 from these recesses.

Figure 6:
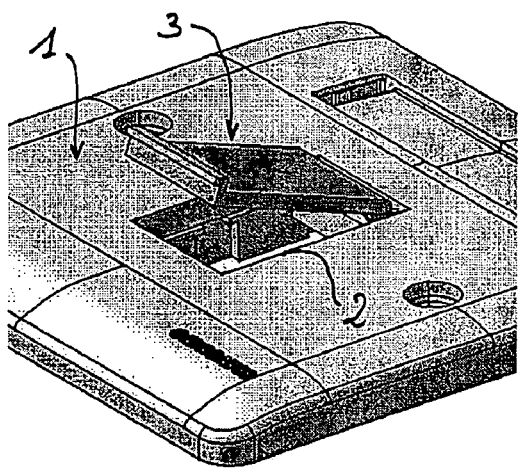
Figure 7:
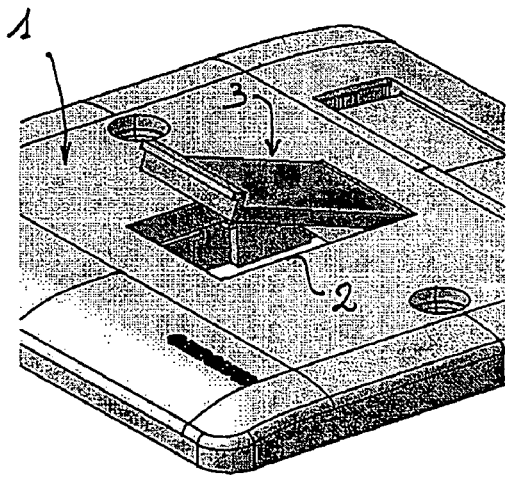

When the flap 3 is placed in the opening 2 (FIGS. 6 and 7), the meeting of the inclined faces 41 of the pins 4 and of the slopes 511 of the reliefs 51 elastically biases these pins together by flexion of the arms 6, and then the pins 4 snap into the recesses 5.

Since the edges of the pins 4 are then opposite the steep slopes 512 of the recesses 5, these pins are held captive and the flap 3 is rendered non-removable.

The invention can be used in particular in the case where the wall 1 is made of a thermosetting polymer, while the flap 3, the arms 6 and the pins 4 are made of polycarbonate.

The invention claimed is:

1. A closure device comprising:
    a wall having a front face and a rear face,
    an opening provided in said wall,
    a flap, said flap having a front face and a rear face which selectively adopts at least one of a closed position in which the flap blocks the opening and an open position in which the flap uncovers said opening,
    pins connected to a first edge of the flap,
    recesses in the wall adjacent the opening, said recesses (5) being disposed to receive the pins, and cooperate with the pins to hold the flap relative to the wall at least in its closed position, wherein said closure device further comprises:
    flexible arms connecting the pins to the first edge of the flap and biasing the pins towards one another, and said flexible arms being arranged to protrude from the first edge and from the rear face of said flap.

2. A closure device according to claim 1, wherein said opening has a first edge and said closure device further comprises a separating part arranged close to the first edge of the opening and adjacent to the first edge of the flap when said flap is in the closed position,
    wherein said separating part defines a retraction slot inside said opening, and
    said flap being adapted to move from its open position to a retracted position by sliding inside the retraction slot.

3. A closure device according to claim 2, wherein the arms have a bayonet profile,
    the rear face of the wall has hollowed recesses of beyond the retraction slot with respect to the separating part, and
    said flap moves from its closed position to its open position upon tilting of the rear face of the flap on a front edge of the separating part, thus, inserting of the first edge of the flap into the slot, and at the same time releasing the pins from the recesses.

4. A closure device according to claim 1, wherein the pins have outer faces which slope towards a median plane of the flap, and
    said recesses which are bordered by reliefs each have a first slope in a direction of insertion of the pins and a second slope in a direction of extraction of the pins, the flap thus being non-removable, and said second slop being steeper than the first slope.

5. A closure device according to claim 1, wherein the wall is made of a thermosetting polymer.

6. A closure device according to claim 1, wherein the flap, the arms, and the pins are made of polycarbonate.

7. A closure device according to claim 2, wherein the pins have outer faces which slope towards a median plane of the flap, and
    said recesses which are bordered by reliefs each have a first slope in a direction of insertion of the pins and a second slope in a direction of extraction of the pins, the flap thus being non-removable, and said second slop being steeper than the first slope.

8. A closure device according to claim 2, wherein the wall is made of a thermosetting polymer.

9. A closure device according to claim 2, wherein the flap, the arms, and the pins are made of polycarbonate.

10. A closure device according to claim 3, wherein the pins have outer faces which slope towards a median plane of the flap, and
    said recesses which are bordered by reliefs each have a first slope in a direction of insertion of the pins and a second slope in a direction of extraction of the pins, the flap thus being non-removable, and said second slope being steeper than the first slope.

11. A closure device according to claim 3, wherein the wall is made of a thermosetting polymer.

12. A closure device according to claim 3, wherein the flap and the pins are made of polycarbonate.

* * * * *

UNITED STATES PATENT AND TRADEMARK OFFICE
CERTIFICATE OF CORRECTION

PATENT NO. : 7,338,315 B2  
APPLICATION NO. : 11/657735  
DATED : March 4, 2008  
INVENTOR(S) : Jacques Fauriot and Etienne Rejou It is certified that error appears in the above-identified patent and that said Letters Patent is hereby corrected as shown below:

On the title page, insert item [30]  
Insert prior application information: --FR 0601014 filed 2/3/2006--.

Column 4, Line 29, please replace "slop" --slope--.

Column 4, Line 46, insert --, the arms-- after "flap".

Signed and Sealed this

Tenth Day of June, 2008

JON W. DUDAS  
*Director of the United States Patent and Trademark Office*